US012637339B1

(12) United States Patent
Zeng et al.

(10) Patent No.: US 12,637,339 B1
(45) Date of Patent: May 26, 2026

(54) MATERIAL HANDLING EQUIPMENT, CONTROLLER, AND METHOD OF DETECTING HANDLING OBJECT

(71) Applicant: VisionNav Robotics USA Inc., Acworth, GA (US)

(72) Inventors: Yongxian Zeng, Acworth, GA (US); Bingchuan Yang, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/191,162

(22) Filed: Apr. 28, 2025

(51) Int. Cl.
*B66F 9/075* (2006.01)
*B66F 9/06* (2006.01)

(52) U.S. Cl.
CPC ............ *B66F 9/0755* (2013.01); *B66F 9/063* (2013.01)

(58) Field of Classification Search
CPC ............................... B66F 9/0755; B66F 9/063
USPC .......................................................... 348/119
See application file for complete search history.

(56) References Cited

U.S. PATENT DOCUMENTS 8,848,201 B1 * 9/2014 Bruce .................. G01B 21/047 356/601
9,561,941 B1 * 2/2017 Watts ................... G05D 1/0268
2011/0158509 A1 * 6/2011 Li ............................. G06T 7/33 382/154
2015/0371080 A1 * 12/2015 Ngan ................... G06V 40/167 382/103
2017/0255196 A1 * 9/2017 Viereck ................. B66F 9/0755
2020/0043146 A1 * 2/2020 Russell ................. G01S 7/4817
2020/0377350 A1 * 12/2020 Nonogaki ............... B66F 9/148
2021/0141368 A1 * 5/2021 Holwell ........... G05B 19/41895
2021/0178593 A1 * 6/2021 Ye .......................... B25J 9/1612
2021/0216073 A1 * 7/2021 Araki ................... G05D 1/0094
2021/0217191 A1 * 7/2021 Kaizu ...................... G01C 3/06
2021/0371260 A1 * 12/2021 Chien ................... B66F 9/0755
2023/0273618 A1 * 8/2023 Thode ........................ B66F 9/20 701/25
2024/0307124 A1 * 9/2024 Bashir .............. A61B 1/000094
2025/0019215 A1 * 1/2025 Koide ................... B66F 17/003
(Continued)

FOREIGN PATENT DOCUMENTS

CN 111091076 B 3/2022
CN 111702054 B 5/2022
CN 116563386 A 8/2023

*Primary Examiner* — Matthew David Kim
(74) *Attorney, Agent, or Firm* — MUNCY, GEISSLER, OLDS & LOWE, P.C.

(57) ABSTRACT

Embodiments of this disclosure relate to a material handling equipment, a controller, and a method of detecting a handling object. The material handling equipment includes a controller configured to execute program instructions to: simultaneously collecting images of a handling object from different angles by using first and second image sensors; obtaining, by using a first image collected by the first image sensor as a main image, a depth map based on the first image and a second image collected by the second image sensor; segmenting a contour of the handling object in the first image from a background; obtaining an actual point cloud of the handling object based on the depth map and the contour of handling object; obtaining a template point cloud of the handling object based on the contour of handling object; and determining a pose of the handling object based on the template and actual point clouds.

19 Claims, 8 Drawing Sheets

20a

(56) References Cited

U.S. PATENT DOCUMENTS

2025/0059012 A1* 2/2025 Schöpp .................. B66F 9/063
2025/0109002 A1* 4/2025 Anderson-Sprecher .................... G05D 1/0246

* cited by examiner

S204

S204a

S206

S208

MATERIAL HANDLING EQUIPMENT, CONTROLLER, AND METHOD OF DETECTING HANDLING OBJECT

TECHNICAL FIELD

This disclosure generally relates to technical field of material handling equipment, and more specifically, to a material handling equipment, a controller, and a method of detecting a handling object.

BACKGROUND

In the field of current intelligent and automatic logistics warehousing, automated guided forklift, as a new generation of intelligent logistics devices, is gradually becoming one of key technologies for improving warehousing efficiency and reducing operation costs. An automated guided forklift, alternatively referred to as an Automated Guided Vehicle (AGV), relies on an autonomous driving technology and intelligent algorithm control, and can implement autonomous navigation, handling, and stacking, thereby effectively alleviating a labor shortage problem, and significantly improving overall efficiency of logistics operations.

BRIEF DESCRIPTION OF THE DRAWINGS

The following briefly describes accompanying drawings necessary for describing embodiments of this disclosure or an existing technology to describe the embodiments of this disclosure. Apparently, the accompanying drawings in the following description are only some embodiments of this disclosure. Those skilled in the art may still obtain accompanying drawings of other embodiments according to examples in these accompanying drawings without creative work.

DETAILED DESCRIPTION OF THE DISCLOSURE

Figure 1:
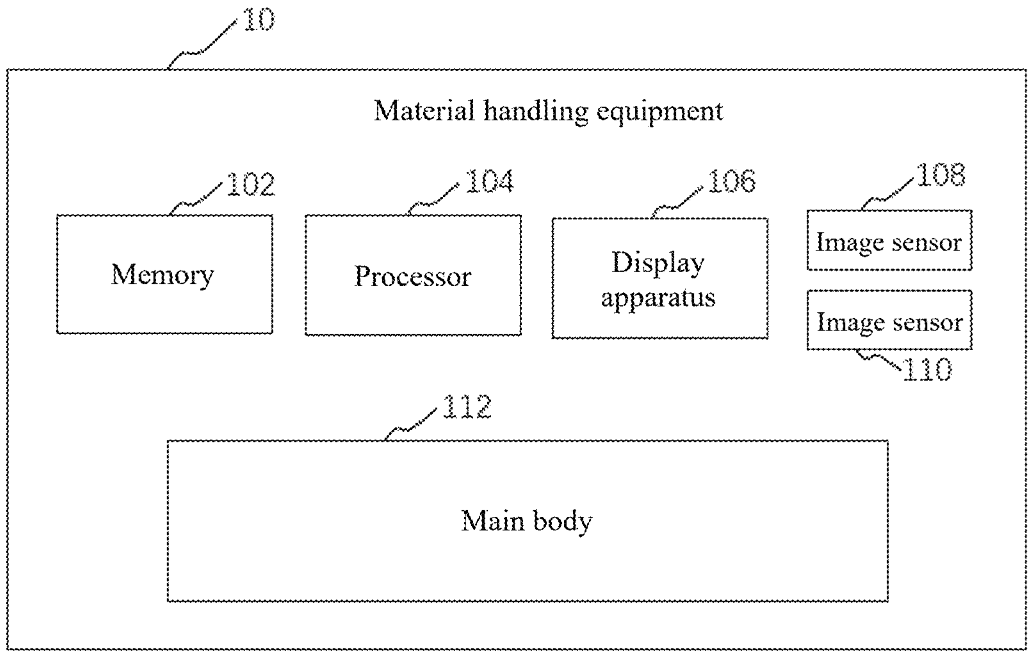
FIG. 1 is a schematic diagram of a material handling equipment according to an embodiment of this disclosure.

To better understand the spirit of this disclosure, further explanation will be provided below in combination with some preferred embodiments of this disclosure.

The following disclosure provides a plurality of implementations or examples, which can be used to implement different features of the present disclosure. Specific examples of components and configurations described below are used to simplify the present disclosure. It may be conceived that these descriptions are merely for exemplary purposes, and are not intended to limit the present disclosure. For example, in the following description, a first feature is formed on or on a second feature, which may include some embodiments in which the first feature and the second feature are in direct contact with each other. In addition, some embodiments may alternatively include that an additional component is formed between the first feature and the second feature, so that the first feature and the second feature may not be in direct contact. In addition, in the present disclosure, component symbols and/or numbers may be repeatedly used in a plurality of embodiments. The repeated use is based on an objective of brevity and clarity, and does not represent a relationship between the different discussed embodiments and/or configurations.

Furthermore, spatially relative terms used herein, such as "below", "under", "lower", "above", "upper", and the like, may be used for convenience of describing a relationship between one component or feature shown in the drawings and another component or feature. These spatially relative terms are intended to cover a plurality of different orientations of the apparatus during use or operation in addition to the orientations shown in the drawings. The device may be placed at another orientation (for example, rotated by 90 degrees or at another orientation), and these spatially relative descriptive terms are to be correspondingly interpreted.

FIG. 1 is a schematic diagram of a material handling equipment according to an embodiment of this disclosure.

As shown in FIG. 1, a material handling equipment 10 includes a memory 102, a processor 104, a display apparatus 106, an image sensor 108, an image sensor 110, and a main body 112. The processor 104 is operatively coupled to the memory 102, the display apparatus 106, the image sensor 108, and the image sensor 110. The processor 104 may implement a method of detecting a handling object according to this disclosure in combination with the memory 102, the display apparatus 106, the image sensor 108, and the image sensor 110. The memory 102, the processor 104, the display apparatus 106, the image sensor 108, and the image sensor 110 may be disposed on the main body 112. The memory 102, the processor 104, the display apparatus 106, the image sensor 108, and the image sensor 110 may be disposed at any position of the main body 112. The memory 102 may be an integrated element. The memory 102 may be considered as including a plurality of storage units. Information, for example, but not limited to, data information such as an image, a point cloud, and a pose of the material handling equipment 10, may be respectively stored in different storage units or stored in the same storage unit. In a specific implementation of this disclosure, the memory 102 may store, but is not limited to, template point clouds of handling objects 20 of different type numbers.

The processor 104 may be an integrated element. The processor 104 may include a plurality of control units/processing units. The processor 104 may read required data information from the memory 102. The processor 104 may store data information to the memory 102. The processor 104 may receive and process an input (such as a touch operation) of a user for the display apparatus 106 or data sensed by the image sensor 108 and the image sensor 110. It is to be noted that this disclosure does not limit the processor 104 to be implemented in hardware, software, or a combination of hardware/software.

The display apparatus 106 may be a touchscreen. The display apparatus 106 may alternatively be a non-touch-screen.

The image sensor 108 is an integrated element. The image sensor 108 may include a plurality of sensor elements. The image sensor 108 may be, but is not limited to, a complementary metal-oxide-semiconductor sensor or a charge-coupled device sensor. The image sensor 110 is an integrated element. The image sensor 110 may include a plurality of sensor elements. The image sensor 110 may be, but is not limited to, a complementary metal-oxide-semiconductor sensor or a charge-coupled device sensor. The image sensor 108 and the image sensor 110 may send collected image information including the material handling equipment 10 to the processor 104.

In an embodiment of this disclosure, the material handling equipment 10 in FIG. 1 may be a device that can automatically or semi-automatically execute a handling task. Common forms of the material handling equipment 10 include: a pallet truck, an Automatic Guided Vehicle (AGV), an Autonomous Mobile Robot (AMR), a humanoid robot, a robotic arm, or the like. In a specific embodiment of this disclosure, the mobile robot may be an unmanned vehicle, for example, an automated guided forklift, applied to a warehouse.

Figure 2:
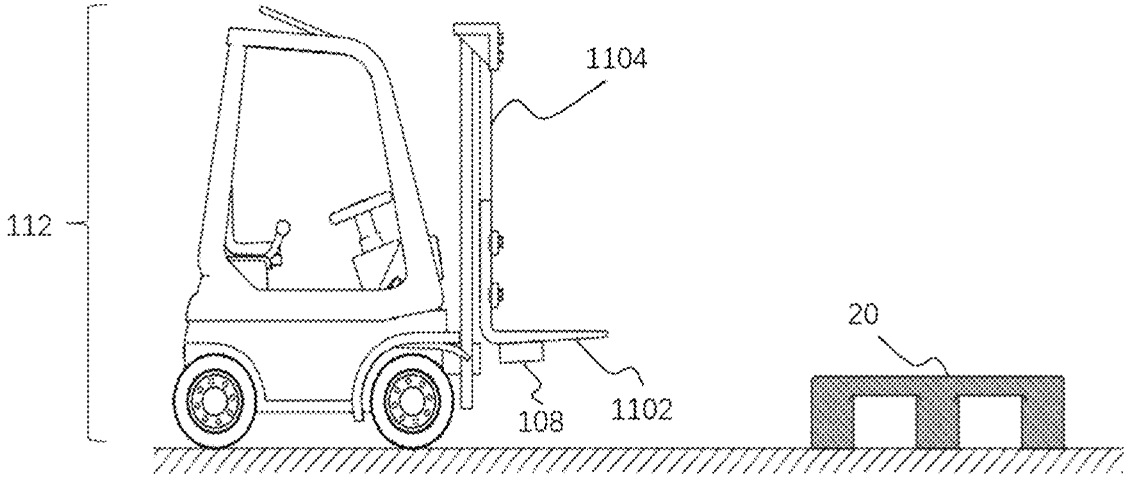
FIG. 2 is a scenario diagram when a material handling equipment is oriented to a handling object according to an embodiment of this disclosure.

FIG. 2 is a scenario diagram when a material handling equipment is oriented to a handling object according to an embodiment of this disclosure. The material handling equipment shown in FIG. 2 is an automated guided forklift. However, it is to be understood that in another embodiment of this disclosure, the material handling equipment may alternatively be in another form.

A main body 112 of a material handling equipment 10 includes a fork 1102 and a portal 1104. It is to be understood that although FIG. 2 only shows the fork 1102, the material handling equipment 10 further includes another fork (not shown).

An image sensor 108 and an image sensor 110 may be disposed on the material handling equipment 10. The image sensor 108 may be disposed on the main body 112. The image sensor 110 may be disposed on the main body 112. The image sensor 108 may be disposed on the fork 1102 or the gantry 1104. The image sensor 110 may be disposed on the fork 1102 or the gantry 1104. The image sensor 108 may be disposed at a position whose field of view can separately cover the handling object 20. The image sensor 110 may be disposed at a position whose field of view can separately cover the handling object 20. In some embodiments of this disclosure, the image sensor 108 and the image sensor 110 may be disposed on the main body 112 of the material handling equipment 10, so that the field of view of the image sensor 108 and the image sensor 110 can simultaneously cover an entire area of the handling object 20. In a specific embodiment of this disclosure, as shown in FIG. 1, the image sensor 108 is disposed at a root of the fork 1102. In this case, the image sensor 110 may be disposed at a root of another fork (not shown).

The handling object 20 may be any object applicable to be handled. The handling object 20 may be a vehicle or a vehicle-free cargo. In an embodiment of this disclosure, the handling object 20 may be a pallet, a material cage, a material bin, a pallet box, an oil bucket, or a carton box. In a specific embodiment of this disclosure, as shown in FIG. 1, the handling object 20 is a pallet.

Figure 3:
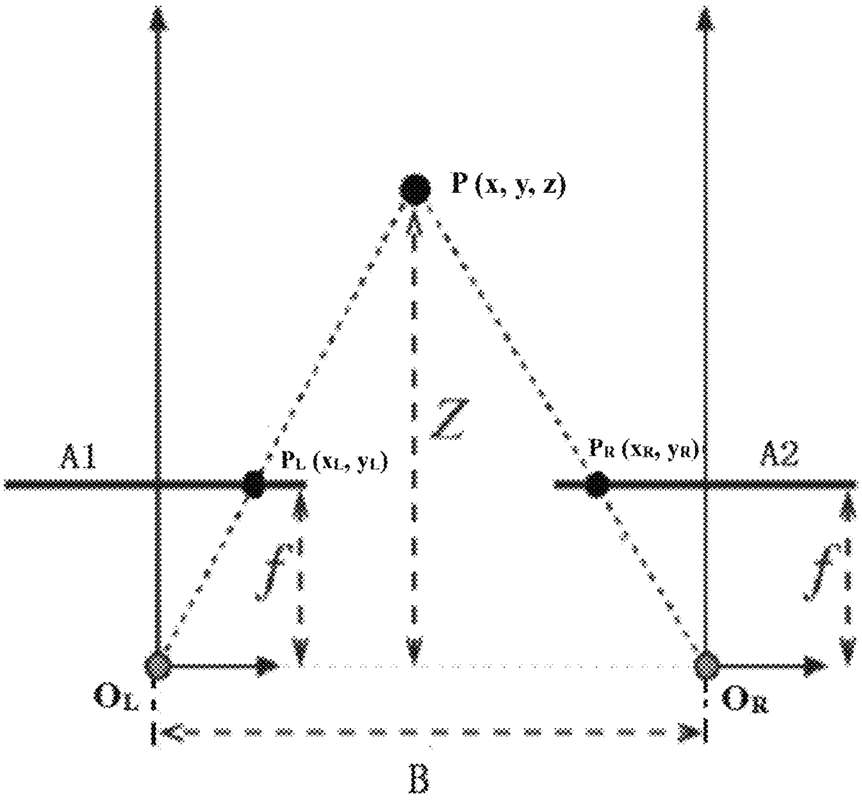
FIG. 3 is a schematic diagram of binocular vision according to an embodiment of this disclosure.

FIG. 3 is a schematic diagram of binocular vision according to an embodiment of this disclosure.

As shown in FIG. 3, the binocular vision consists of the image sensor 108 and the image sensor 110 shown in FIG. 1 and FIG. 2. The image sensor 108 and the image sensor 110 may be the same image sensor. For example, parameters such as a field of view, a focal length, an internal parameter, and a distortion coefficient of the image sensor 108 and the image sensor 110 are the same. In another embodiment of this disclosure, the image sensor 108 and the image sensor 110 may alternatively be different image sensors.

A case in which the image sensor 108 and the image sensor 110 are the same is described below with reference to FIG. 1 to FIG. 3.

Assuming that real coordinates of a to-be-detected handling object 20 in a three-dimensional space is P(x, y, z), a projection point of the to-be-detected handling object 20 on an image plane A1 of the image sensor 108 is $P_L(x_L, y_L)$, and a projection point of the to-be-detected handling object 20 on an image plane A2 of the image sensor 110 is $P_R(X_R, y_R)$. A distance between an optical center $O_L$ of the image sensor 108 and an optical center $O_R$ of the image sensor 110 is a baseline distance B. A vertical distance from the image plane A1 to the optical center $O_L$ of the image sensor 108 is f (that is: a focal length f of the image sensor 108), and a vertical distance from the image plane A2 to the optical center $O_R$ of the image sensor 110 is f (that is: a focal length f of the image sensor 110). On the image plane A1, an imaging point of the image sensor 108 is $P_L(x_L, y_L)$, and a horizontal coordinate of the imaging point is $x_L$. On the image plane A2, an imaging point of the image sensor 110 is $P_R(X_R, y_R)$, and a horizontal coordinate of the imaging point is $x_R$. A difference between horizontal positions of the handling object 20 on the image plane A1 and the image plane A2 is a parallax. The parallax exists because angles at which the image sensor 108 and the image sensor 110 photograph the same handling object 20 are different. A larger parallax means that the handling object 20 is closer to the image sensor 108 and the image sensor 110. On the contrary, a smaller parallax means that the handling object 20 is farther from the image sensor 108 and the image sensor 110. Z is a depth from the handling object 20 to the image sensor 108 or the image sensor 110.

Compared with a Lidar, the material handling equipment and the method of detecting a handling object in this disclosure have at least the following advantages: (1) the hardware costs are lower, so that the material handling equipment is more applicable for large-scale deployment; (2) the image sensor 108 and the image sensor 110 are passive sensing devices, and do not emit light or radiation in any form, but rely on a light source in an environment, so that the image sensor 108 and the image sensor 110 are more applicable to some radiation sensitive application scenarios; (3) the image sensor 108 and the image sensor 110 may work under various indoor and outdoor lighting conditions, and can provide effective depth information as long as there are sufficient texture information and lighting intensity; and (4)

the image sensor 108 and the image sensor 110 can process more complex scenarios, including an environment with rich texture, whereas the Lidar used in the existing technology may be affected by reflection and scattering in these scenarios.

Figure 4:
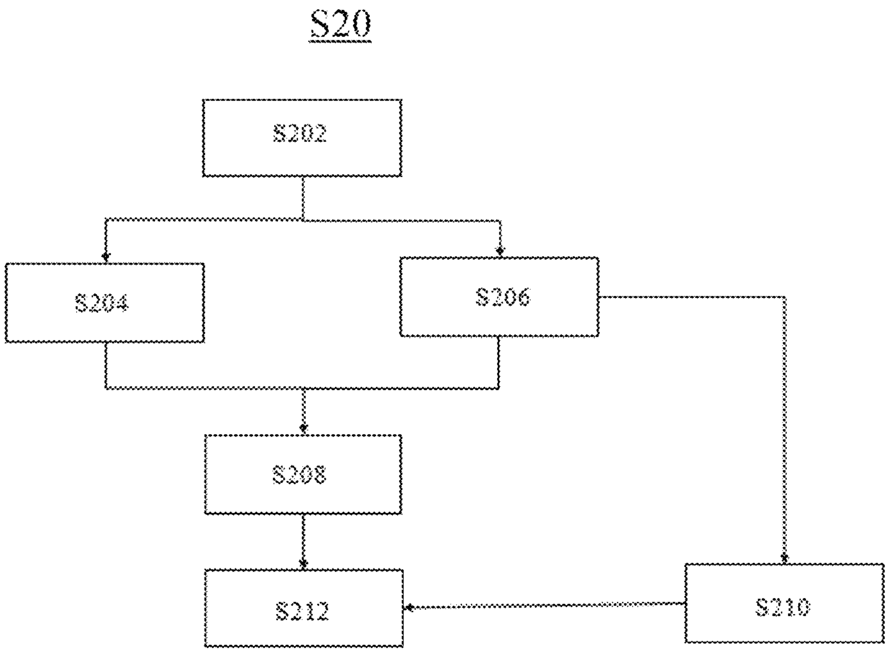
FIG. 4 is a schematic flowchart of a method of detecting a handling object according to an embodiment of this disclosure.

FIG. 4 is a schematic flowchart of a method of detecting a handling object according to an embodiment of this disclosure.

When the pose of the handling object is determined by the method of detecting a handling object according to this embodiment of this disclosure, first, the material handling equipment 10 moves toward the handling object 20, so that the image sensor 108 and the image sensor 110 may collect an image of the handling object 20. After the image of the handling object 20 is collected, the processor 104 performs subsequent processing on the image, and performs corresponding actions, to finally determine the pose of the handling object 20.

As shown in FIG. 4, a method of detecting a handling object S20 includes action S202, action S204, action S206, action S208, action S210, and action S212. The method of detecting a handling object S20 is performed by a processor 104 coupled to an image sensor 108, an image sensor 110, and a memory 102. Specifically, program instructions stored in the memory 102 are configured to enable the material handling equipment 10 to perform the method of detecting a handling object S20 by using the processor 104.

In action S202, an image of a handling object 20 is collected. That the image of the handling object 20 is collected may include that images of the handling object 20 may be simultaneously collected from different angles by using the image sensor 108 and the image sensor 110 shown in FIG. 1 and FIG. 2.

In an embodiment of this disclosure, the method of detecting a handling object S20 further includes preprocessing the collected image. Specifically, operations such as distortion correction, denoising, contrast enhancement, and edge detection may be performed on the images collected by the image sensor 108 and the image sensor 110, to improve accuracy of subsequent processing.

The following describes action S204, action S206, action S208, action S210, and action S212 in FIG. 4 in detail with reference to FIG. 5 to FIG. 11.

Figure 5:
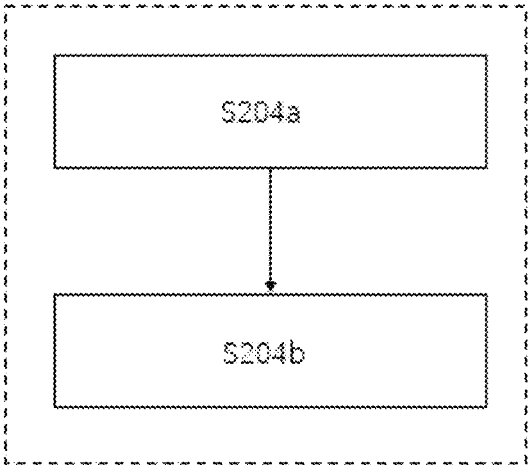
FIG. 5 is a specific schematic flowchart of obtaining a depth map based on a collected image.
Figure 6:
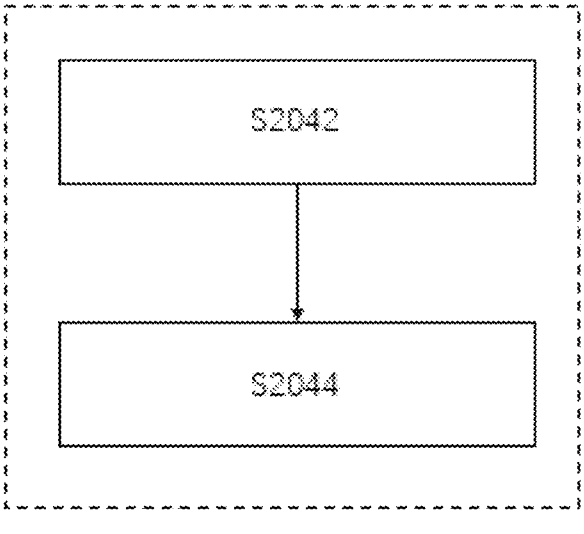
FIG. 6 is a specific schematic flowchart of obtaining a parallax map by using a stereo matching algorithm.

FIG. 5 is a specific schematic flowchart of obtaining a depth map based on a collected image. FIG. 6 is a specific schematic flowchart of obtaining a parallax map by using a stereo matching algorithm.

As shown in FIG. 4 to FIG. 6, in action S204, a depth map is obtained based on the collected image.

Action S204 includes: action S204*a* and action S204*b*.

Action S204*a* includes actions S2042 and S2044. In action S204*a*, a parallax map is obtained by using an image collected by the image sensor 108 as a main image and using a stereo matching algorithm. In action S2042, a corresponding feature point is identified and matched. That the corresponding feature point is identified and matched includes: corresponding feature points are found in the image collected by the image sensor 108 and the image collected by the image sensor 108, and these feature points may be corner points, edges, and the like; and a matched pixel pair is found by comparing features of the image collected by the image sensor 108 and the image collected by the image sensor 108. A matching policy includes, but is not limited to, a stereo matching algorithm. The stereo matching algorithm is one of a block matching algorithm, a semi-global matching algorithm, and a deep learning stereo matching algorithm. The deep learning stereo matching algorithm includes, but is not limited to, RAFT-Stereo or PSMnet. In action S2044, a parallax value is calculated. That the parallax value is calculated includes: the parallax value is calculated according to a geometrical relationship between the matched feature points and the image sensor 108 and the image sensor 110. The parallax value is calculated by using the following formula: $d=b_L-b_R$, where d is a parallax value; $b_L$ is a pixel coordinate of the feature point in the image sensor 108; and $b_R$ is a pixel coordinate of the feature point in the image sensor 110. The calculated parallax value is mapped to an image plane to generate a parallax map.

In action S204*b*, the parallax map is transformed into a depth map. That the parallax map is transformed into the depth map includes: a depth value of each point on a surface of the handling object 20 is calculated by using a parameter of the image sensor 108/110 and the parallax value obtained in action S2044 to obtain the depth map. Specifically, the depth value is calculated according to the following formula: $Z=fB/d$, where Z is the depth value; f is a focal length of an image sensor 108/110; B is a baseline distance between the image sensors; and d is the parallax value. The calculated depth value is mapped to the image plane to generate the depth map.

Figure 7:
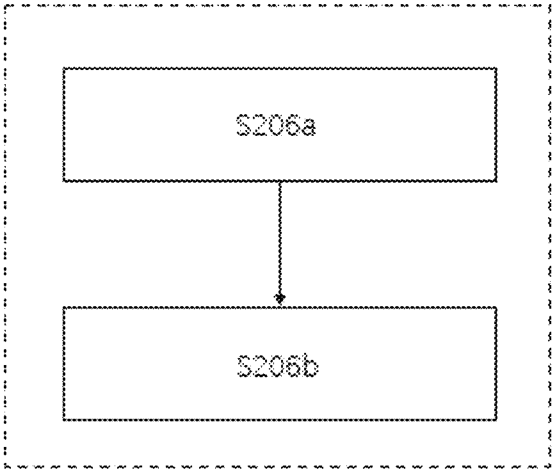
FIG. 7 is a specific schematic flowchart of segmenting a contour of a handling object from a background.

FIG. 7 is a specific schematic flowchart of segmenting a contour of a handling object from a background.

As shown in FIG. 4 to FIG. 7, in action S206, a contour of the handling object is segmented from the background.

Action S206 includes actions S206*a* and S206*b*.

In action S206*a*, the collected image is detected by using deep learning instance segmentation. In action S206*b*, the contour of the handling object 20 is segmented from the background. The image collected by the image sensor 108 is detected by using the deep learning instance segmentation, and the contour of the handling object 20 is segmented from the background. The deep learning instance segmentation includes, but is not limited to, the following methods: Mask R-CNN, YOLCAT, PointRend, Hybrid Task Cascade (HTC), Mask Transfiner, and the like. Using the Mask R-CNN method as an example, the method includes: (1) an image collected by the image sensor 108 is input into a Mask R-CNN model; (2) feature extraction is performed on the image by using a Convolutional Neural Network (CNN), such as ResNet, to generate a feature map; (3) a Region Proposal Network (RPN) is run on the feature map to generate a series of candidate target regions (that is, Regions of Interest); (4) an RoI Align operation is applied to each candidate region to extract a feature vector having a fixed size from the feature map; (5) each extracted feature vector is classified by using a fully connected layer (or a convolutional layer) to predict a category of the candidate region; meanwhile, boundary box regression is performed to adjust a position of the candidate region to more closely surround a target object; (6) Non-Maximum Suppression (NMS) is performed on the generated candidate region, a region with excessively high overlapping degree is removed, and only a most possible detection result is reserved; and (7) a final instance segmentation result is generated according to a classification score and a mask (that is: the contour of the handling object 20). In an embodiment of this disclosure, the contour of the handling object 20 segmented from the background may alternatively be a color image.

Figure 8:
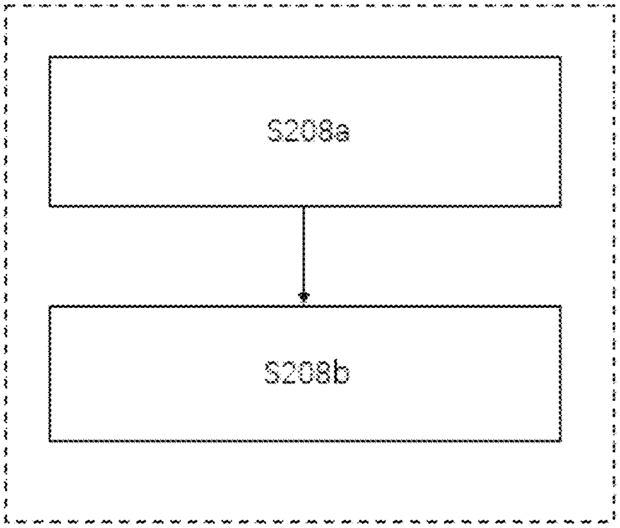
FIG. 8 is a specific schematic flowchart of obtaining an actual point cloud of a handling object based on a depth map and a contour of the handling object.

FIG. 8 is a specific schematic flowchart of obtaining an actual point cloud of a handling object based on a depth map and a contour of the handling object.

As shown in FIG. 4 to FIG. 8, in action S208, an actual point cloud of the handling object is obtained based on a depth map and a contour of the handling object.

Action S208 includes action S208*a* and action S208*b*.

In action S208*a*, the depth map of the handling object 20 is obtained based on the depth map and the contour of the handling object 20. Because the depth map is aligned with pixels in the image collected by the image sensor 108 (that is, the depth map uses the image collected by the image sensor 108 as a main image) and the contour of the handling object 20 is from the image collected by the image sensor 108, the depth map of the handling object 20 may be directly obtained. In addition, because the contour of the handling object 20 has been segmented from the background in FIG. 7, the depth map of the handling object 20 may be directly obtained, and the depth map does not need to be entirely compared with the image collected by the image sensor 108. This effectively reduces a calculation amount and saves time required for processing by the processor.

In action S208*b*, the actual point cloud of the handling object is obtained based on the depth map of the handling object. That the actual point cloud of the handling object 20 is obtained based on the depth map of the handling object 20 includes: a coordinate of each pixel point in the depth map of the handling object 20 is mapped from a pixel coordinate system to a point cloud coordinate system by using an index according to an internal parameter of the image sensor 108/110, so as to transform the depth map of the handling object 20 into the actual point cloud. For example, in an embodiment of this disclosure, (1) preprocessing operations such as denoising and filtering are performed on the depth map of the handling object 20 to improve accuracy and efficiency of subsequent processing; (2) the depth value of each pixel point in the depth map of the handling object 20 is projected and transformed into a coordinate in 3D space of the image sensor 108 or the image sensor 110 by using the internal parameter of the image sensor 108 or the image sensor 110; a transform matrix is as follows:

$$\begin{bmatrix} u \\ v \\ d \end{bmatrix} = \begin{bmatrix} f_x & 0 & c_x \\ 0 & f_y & c_y \\ 0 & 0 & 1 \end{bmatrix} \begin{bmatrix} x \\ y \\ z \end{bmatrix},$$

where (u, v) are coordinates of a pixel point in the depth map of the handling object 20; d is a depth value corresponding to the pixel point; fx and fy are focal lengths of the image sensor 108 or the image sensor 110 on an x-axis and a y-axis; cx and cy are an x-coordinate and a y-coordinate of an image center point (alternatively referred to as an optical center or a main point) in an image coordinate system; (x, y, z) are 3D spatial coordinates of a point cloud corresponding to (u, v); (3) the transformed 3D point coordinates are organized into a point cloud data structure, such as a point cloud file (for example, in a format of PLY or PCD) or a point cloud object; each point in the point cloud includes position information (X, Y, Z), and may include other attributes (such as color information); and (4) further processing, such as downsampling, denoising, and registration, is performed on the generated point cloud, to improve quality and availability of the point cloud.

Figure 9:
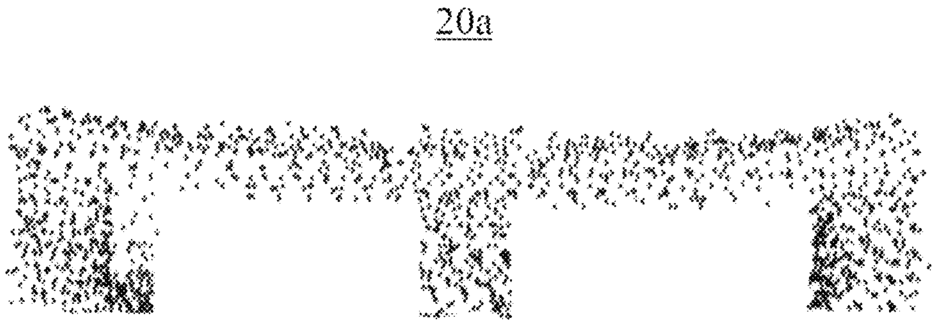
FIG. 9 is an actual point cloud of a handling object according to an embodiment of this disclosure.

FIG. 9 is an actual point cloud of a handling object. FIG. 9 is an actual point cloud 20*a* of the handling object 20 obtained after the method shown in FIG. 5 to FIG. 8 is performed on the handling object 20 shown in FIG. 1.

Figure 10:
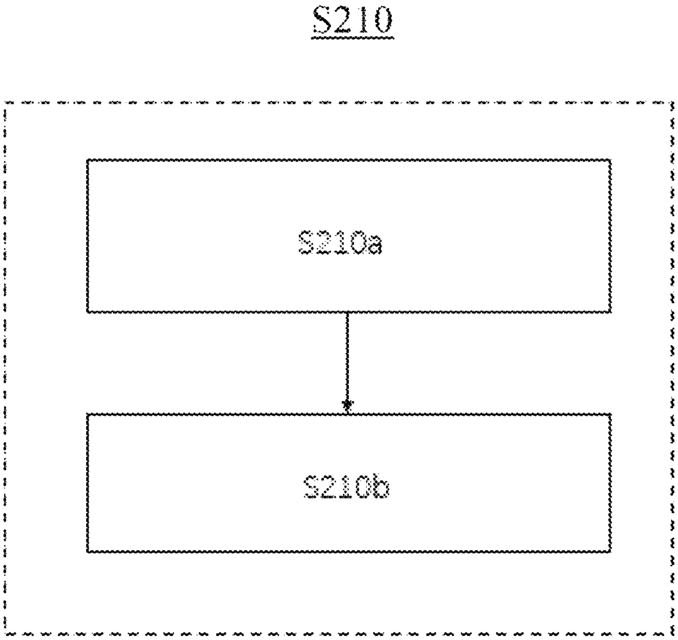
FIG. 10 is a specific schematic flowchart of obtaining a template point cloud corresponding to a handling object based on a contour of the handling object.

FIG. 10 is a specific schematic flowchart of obtaining a template point cloud corresponding to a handling object based on a contour of the handling object.

As shown in FIG. 4 to FIG. 10, in action S210, a template point cloud corresponding to the handling object is obtained based on a contour of the handling object.

Action S210 includes action S210*a* and action S210*b*.

In action S210*a*, a type number corresponding to the handling object 20 is determined according to the contour of the handling object 20. After the contour of the handling object 20 is segmented from the background of the image collected by the image sensor 108 through deep learning instance segmentation, the contour of the handling object 20 is compared with the handling objects 20 of different type numbers stored in a memory 102, so that the type number corresponding to the contour of the handling object 20 is determined.

Figure 11:
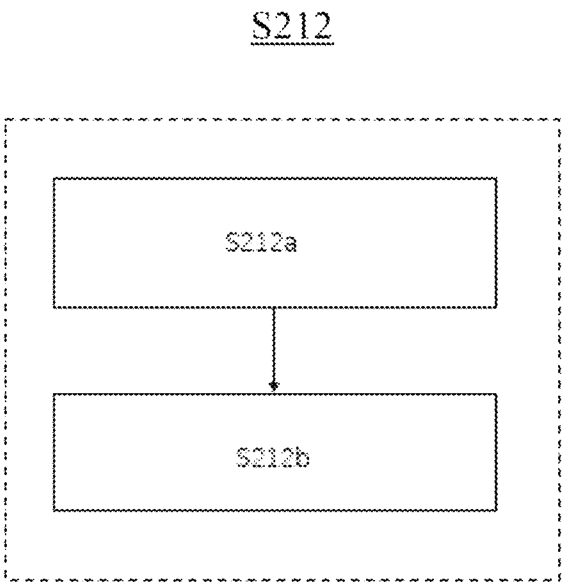
FIG. 11 is a specific schematic flowchart of determining a pose of a handling object based on a template point cloud and an actual point cloud.

In action S210*b*, the template point cloud corresponding to the handling object is obtained according to the type number. The template point cloud of the handling object 20 corresponding to the type number may be directly obtained from the memory 102 according to the type number determined in action S210*a*. In an embodiment of this disclosure, the template point cloud is from a point cloud of the handling object 20 that has the same structure and size as that of the handling object 20. FIG. 11 is a specific schematic flowchart of determining a pose of a handling object based on a template point cloud and an actual point cloud.

As shown in FIG. 4 to FIG. 11, in action S212, a pose of the handling object is determined based on the template point cloud and the actual point cloud.

Action S212 includes action S212*a* and action S212*b*.

In action S212*a*, a rotation-translation matrix between the template point cloud and the actual point cloud is obtained. In action S212*b*, a pose of the handling object 20 is determined. The rotation-translation matrix between the template point cloud and the actual point cloud may be obtained by using a point cloud precise registration algorithm, so as to determine the pose of the handling object 20. The point cloud precise registration algorithm is used for calculating an optimal rotation-translation matrix between a point cloud in the template point cloud and a point cloud in the actual point cloud, so as to align the point cloud in the template point cloud and the point cloud in the actual point cloud, thereby determining the pose of the handling object 20. The rotation-translation matrix includes rotation and translation information required to transform the actual point cloud into the template point cloud. A precise pose of the handling object 20 may be obtained by solving the rotation-translation matrix. The point cloud precise registration algorithm may be, but is not limited to, an Iterative Closest Point (ICP) algorithm.

In an embodiment of this disclosure, the pose of the handling object 20 may be determined through the following actions: (1) closest point pairs between the template point cloud and the actual point cloud are iteratively calculated by using the ICP algorithm, and the rotation-translation matrix is estimated by minimizing a distance between the point pairs; in each iteration, the ICP algorithm may include, but is not limited to: a group of points (usually, all points or a subset) in the actual point cloud is selected, closest corresponding points are found in the template point cloud for these points, a rotation-translation matrix is calculated by using these point pairs, and the actual point cloud is transformed to a new position by using the rotation-translation matrix; (2) iteration is repeated until a convergence condition is satisfied (for example, a distance change is less than a threshold or a maximum number of iterations is reached); (3) a final rotation-translation matrix is obtained from an output of the ICP algorithm; and (4) a translation vector (that is: a position of the handling object 20) and a rotation matrix (that is: a direction of the handling object 110) in the rotation-translation matrix are extracted to determine the pose of the handling object 20.

In another embodiment of this disclosure, when the contour of the handling object 20 is a color image, the point cloud precise registration algorithm may be the ICP algorithm including color information. In this case, the pose of the handling object 20 may be determined through the following actions: (1) a transformation matrix between a template point cloud set and an actual point cloud set is constructed, and an objective function is solved based on the transformation matrix to transform the transformation matrix into a linear transformation formula including a transformation parameter; (2) a color of a point cloud in the actual point cloud set is transformed into a color intensity value, and a color gradient of each point cloud in the actual point cloud set is calculated; (3) a color objective function of the transformation matrix is constructed by using the color of the point cloud as a registration condition, and the transformation matrix is transformed into a color linear transformation formula including the transformation parameter according to the color objective function and the color gradient of each point cloud in the actual point cloud set; (4) a solution equation is constructed according to the linear transformation formula and the color linear transformation formula to solve the transformation parameter to determine the transformation matrix; and (5) the pose of the handling object 20 is determined according to the transformation matrix. The pose of the handling object 20 may be determined more conveniently and accurately by using the ICP algorithm having the color information.

Figure 12:
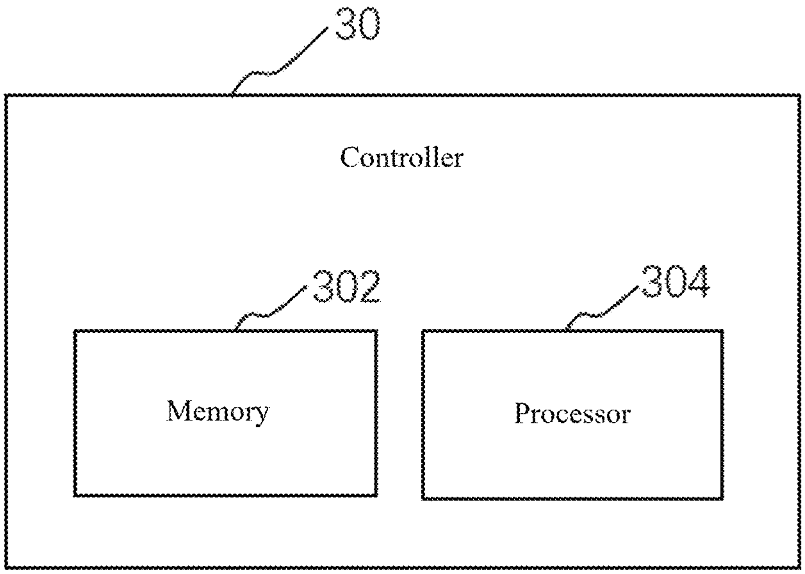
FIG. 12 is a schematic diagram of a controller according to an embodiment of this disclosure.

FIG. 12 is a schematic diagram of a controller according to an embodiment of this disclosure. As shown in FIG. 12, the controller 30 includes a memory 302 and a processor 304. In some embodiments of this disclosure, the memory 302 is the same as the memory 102 shown in FIG. 1, and the processor 304 is the same as the processor 104 shown in FIG. 1. The memory 302 may store program instructions, and the processor 304 may be configured to execute the program instructions to perform the handling object detection method S20. When the controller 30 is applied to the material handling equipment 10 shown in FIG. 1 and FIG. 2, the processor 304 may cooperate with the memory 302, a display apparatus, and a sensor to perform the method of detecting a handling object S20 to determine a pose of a handling object 20. In some embodiments, the controller 30 may be a plug and play apparatus. In some embodiments, the controller 30 may be connected to the material handling equipment 10 in a wired or wireless manner.

The method of detecting a handling object and the material handling equipment according to the embodiments of this disclosure further have at least the following advantages: by using a method combining deep learning instance segmentation and point cloud registration, handling objects, such as a standard pallet and a material cage, can be detected, and asymmetric, damaged, curved, and other irregular handling objects can be detected. Therefore, the method of detecting a handling object and the material handling equipment according to the embodiments of this disclosure have higher universality, and can cover all types of handling objects, which greatly improves universality, accuracy, and efficiency of handling object identification in warehouse logistics.

Figure 13:
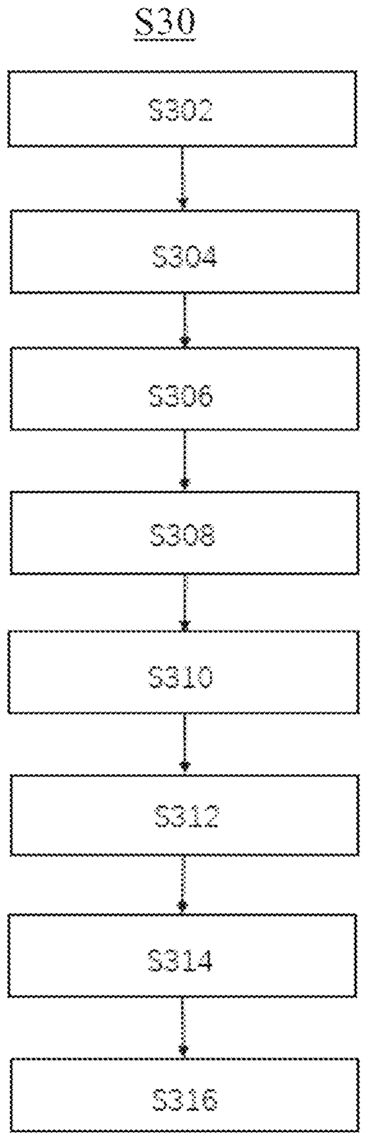
FIG. 13 is a method for determining a pose of a handling object by using a Lidar.

FIG. 13 is a method for determining a pose of a handling object by using a Lidar. According to the method, the Lidar is used as a sensor. After point cloud data of a handling object is obtained, point cloud feature extraction and a pose calculation are performed by using a point cloud processing algorithm.

As shown in FIG. 13, method S30 includes action S302, action S304, action S306, action S308, action S310, action S312, action S314, and action S316.

In action S302, a handling object is scanned by using the Lidar to obtain point cloud data of the handling object.

In action S304, preprocessing is performed on the point cloud data of the handling object. The preprocessing may include, but is not limited to, operations such as denoising, filtering, and downsampling to reduce a calculation amount of subsequent processing and improve robustness of an algorithm.

In action S306, a feature is extracted from the point cloud data by using an algorithm such as PFH, FPFH, SHOT, or ISS. These feature descriptors can capture geometric and topological features of the point cloud, such as a spatial relationship of a point pair, a normal direction of a surface, and a curvature.

In action S308, a key point in the point cloud data is detected by using an algorithm such as NARF or Harris3D. The key point may be some prominent positions in the point cloud, such as a corner point, an edge point, or a plane point, which are very important for subsequent object identification and matching.

In action S310, local descriptor construction is constructed around the key point. The descriptor construction can uniquely identify a local surface in the point cloud. The descriptor may be invariant to transformation such as translation or rotation.

In action S312, a matched object model is searched by using an extracted local feature and the descriptor construction. This involves a nearest neighbor search, a voting mechanism, or a machine learning method to identify and locate an object.

In action S314, a pose of the handling object is determined. Action S314 may be implemented through a Perspective-n-Point (PnP) algorithm, an ICP algorithm, or a feature point correspondence-based method.

In action S316, a result is optimized. That the result is optimized may include removing false detection, fusing data of a plurality of sensors, or using a tracking algorithm to improve detection stability.

Compared with the method of detecting a handling object shown in FIG. 4 to FIG. 11, the method for determining a pose of a handling object by using the Lidar shown in FIG. 13 has at least the following shortcomings: (1) the used Lidar has a high price; (2) the used Lidar has few selectable products on the market, has a risk of insufficient supplies, and is not beneficial to large-scale promotion; (3) the used Lidar point cloud is sparse and lacks object texture and color information, so it is difficult to perform subsequent algorithm processing; (4) the used Lidar data collection time is relatively long; (5) the used Lidar has a poor effect of scanning a black object, and a point cloud easily diverges; and (6) for different handling objects, a point cloud feature extraction algorithm needs to be artificially and carefully designed, and the universality is poor.

It is to be noted that, references to "an embodiment of this disclosure" or similar terms throughout this specification mean that a particular feature, structure, or characteristic described in connection with another embodiment is included in at least one embodiment and may not necessarily be presented in all embodiments. Therefore, corresponding appearances of a phrase "an embodiment of this disclosure" or similar terms in various places throughout this specification do not necessarily refer to a same embodiment. In addition, the particular feature, structure, or characteristic of any particular embodiment may be combined with one or more other embodiments in any proper manner.

Technical content and technical characteristics of this disclosure have been disclosed as above, however, those skilled in the art may still make various substitutions and modifications that do not depart from the spirit of this disclosure based on the teachings of this disclosure. Therefore, the scope of protection of this disclosure is not limited to the content disclosed in the embodiments, but includes various substitutions and modifications that do not depart from this disclosure and are covered by claims of this disclosure.

We claim:

1. A material handling equipment, comprising:

a first image sensor;

a second image sensor; and a controller configured to execute program instructions to:

simultaneously collecting images of a handling object from different angles by using the first image sensor and the second image sensor;

obtaining, by using a first image collected by the first image sensor as a main image, a depth map based on the first image and a second image collected by the second image sensor;

segmenting a contour of the handling object in the first image from a background;

obtaining an actual point cloud of the handling object based on the depth map and the contour of the handling object;

obtaining a template point cloud of the handling object based on the contour of the handling object; and determining a pose of the handling object based on the template point cloud and the actual point cloud, wherein determining a pose of the handling object based on the template point cloud and the actual point cloud comprises: transforming the transformation matrix between the template point cloud and the actual point cloud into a linear transformation formula including a transformation parameter; transforming a color of a point cloud in the actual point cloud into a color intensity value, and calculating a color gradient of each point cloud in the actual point cloud; constructing a color objective function of the transformation matrix by using the color of the point cloud as a registration condition, and transforming the transformation matrix into a color linear transformation formula including the transformation parameter according to a color objective function and the color gradient; determining the transformation matrix according to the linear transformation formula and the color linear transformation formula; and determining the pose of the handling object according to the transformation matrix.

2. The material handling equipment according to claim 1, further comprising preprocessing the first image and the second image in at least one of the following manners: distortion correction, denoising, contrast enhancement, and edge detection.

3. The material handling equipment according to claim 1, wherein obtaining a depth map based on the first image and the second image collected by the second image sensor comprises:

obtaining a parallax map by using a stereo matching algorithm; and transforming the parallax map into the depth map.

4. The material handling equipment according to claim 3, wherein obtaining a parallax map by using a stereo matching algorithm comprises:

identifying and matching a corresponding feature point in the first image and the second image; and calculating a parallax value, and generating the parallax map based on the parallax value, wherein the parallax value is calculated according to the following formula: $d=b_L-b_R$, wherein d is the parallax value; $b_L$ is a pixel coordinate of a feature point in the first image; and $b_R$ is a pixel coordinate of the feature point in the second image.

5. The material handling equipment according to claim 4, wherein transforming the parallax map into the depth map comprises:

calculating a depth value at each point on a surface of the handling object by using the parallax map and a parameter of the first image sensor or the second image sensor; and generating the depth map based on the depth value.

6. The material handling equipment according to claim 5, wherein the depth value is calculated according to the following formula:

$$Z = \frac{fB}{d},$$

wherein Z is the depth value; f is a focal length of the first image sensor or the second image sensor; B is a baseline distance between the first image sensor and the second image sensor; and d is the parallax value.

7. The material handling equipment according to claim 3, wherein stereo matching algorithm comprises a block matching algorithm, a semi-global matching algorithm, and a deep learning stereo matching algorithm.

8. The material handling equipment according to claim 1, wherein segmenting a contour of the handling object in the first image from a background comprises:

detecting the first image by using deep learning instance segmentation; and segmenting the contour of the handling object from the background.

9. The material handling equipment according to claim 8, wherein obtaining an actual point cloud of the handling object based on the depth map and the contour of the handling object comprises:

obtaining a depth map of the handling object based on the depth map and the contour of the handling object; and obtaining the actual point cloud of the handling object based on the depth map of the handling object.

10. The material handling equipment according to claim 9, wherein obtaining the actual point cloud of the handling object based on the depth map of the handling object comprises:

transforming a depth value of each pixel in the depth map of the handling object into corresponding three-dimensional coordinates according to an internal parameter of the first image sensor or the second image sensor and the depth value in the depth map of the handling object; and combining all calculated three-dimensional coordinates to obtain the actual point cloud of the handling object.

11. The material handling equipment according to claim 1, wherein obtaining a template point cloud of the handling object based on the contour of the handling object comprises:

determining a type corresponding to the handling object according to the contour of the handling object; and obtaining the template point cloud of the handling object according to the type.

12. The material handling equipment according to claim 11, wherein the template point cloud is from a point cloud of a handling object having the same structure and size as those of the handling object.

13. The material handling equipment according to claim 1, wherein the rotation-translation matrix is obtained by using a point cloud precise registration algorithm.

14. The material handling equipment according to claim 13, wherein the point cloud precise registration algorithm is an Iterative Closest Point (ICP) algorithm.

15. The material handling equipment according to claim 1, wherein the contour of the handling object is a color image, and the point cloud precise registration algorithm is an ICP algorithm comprising color information.

16. The material handling equipment according to claim 1, wherein the first image sensor and the second image sensor are image sensors having different parameter configurations.

17. The material handling equipment according to claim 1, wherein the handling object is a vehicle or vehicle-free product.

18. A controller configured to execute program instructions to:

simultaneously collecting images of a handling object from different angles by using a first image sensor and a second image sensor;

obtaining, by using a first image collected by the first image sensor as a main image, a depth map based on the first image and a second image collected by the second image sensor;

segmenting a contour of the handling object in the first image from a background;

obtaining an actual point cloud of the handling object based on the depth map and the contour of the handling object;

obtaining a template point cloud of the handling object based on the contour of the handling object; and determining a pose of the handling object based on the template point cloud and the actual point cloud, wherein determining a pose of the handling object based on the template point cloud and the actual point cloud comprises: transforming the transformation matrix between the template point cloud and the actual point cloud into a linear transformation formula including a transformation parameter; transforming a color of a point cloud in the actual point cloud into a color intensity value, and calculating a color gradient of each point cloud in the actual point cloud; constructing a color objective function of the transformation matrix by using the color of the point cloud as a registration condition, and transforming the transformation matrix into a color linear transformation formula including the transformation parameter according to a color objective function and the color gradient; determining the transformation matrix according to the linear transformation formula and the color linear transformation formula; and determining the pose of the handling object according to the transformation matrix.

19. A method of detecting a handling object, comprising:

simultaneously collecting images of a handling object from different angles by using a first image sensor and a second image sensor;

obtaining, by using a first image collected by the first image sensor as a main image, a depth map based on the first image and a second image collected by the second image sensor;

segmenting a contour of the handling object in the first image from a background;

obtaining an actual point cloud of the handling object based on the depth map and the contour of the handling object;

obtaining a template point cloud of the handling object based on the contour of the handling object; and determining a pose of the handling object based on the template point cloud and the actual point cloud, wherein determining a pose of the handling object based on the template point cloud and the actual point cloud comprises: transforming the transformation matrix between the template point cloud and the actual point cloud into a linear transformation formula including a transformation parameter; transforming a color of a point cloud in the actual point cloud into a color intensity value, and calculating a color gradient of each point cloud in the actual point cloud; constructing a color objective function of the transformation matrix by using the color of the point cloud as a registration condition, and transforming the transformation matrix into a color linear transformation formula including the transformation parameter according to a color objective function and the color gradient; determining the transformation matrix according to the linear transformation formula and the color linear transformation formula; and determining the pose of the handling object according to the transformation matrix.

* * * * *